United States Patent
Knowles

(10) Patent No.: US 8,556,738 B2
(45) Date of Patent: Oct. 15, 2013

(54) APPARATUS COMPRISING A SHAFT AND A BALANCING SLEEVE

(75) Inventor: Grahame Knowles, Lincoln (GB)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/203,318

(22) PCT Filed: Feb. 24, 2010

(86) PCT No.: PCT/EP2010/052336
§ 371 (c)(1),
(2), (4) Date: Nov. 8, 2011

(87) PCT Pub. No.: WO2010/100062
PCT Pub. Date: Sep. 10, 2010

(65) Prior Publication Data
US 2012/0094776 A1    Apr. 19, 2012

(30) Foreign Application Priority Data
Mar. 3, 2009 (EP) .................................. 09154259

(51) Int. Cl.
*F16C 3/02* (2006.01)
*F16F 15/32* (2006.01)

(52) U.S. Cl.
USPC ........................................................ 464/180

(58) Field of Classification Search
USPC ............... 464/127, 180; 188/378–380; 74/574.2–574.4
See application file for complete search history.

(56) References Cited

U.S. PATENT DOCUMENTS

| | | | |
|---|---|---|---|
| 1,645,323 A | | 10/1927 | Griswold |
| 2,522,958 A | * | 9/1950 | Palmer ..................... 464/180 X |
| 3,504,573 A | | 4/1970 | Yoshida |
| 4,223,565 A | * | 9/1980 | Sugiyama et al. ............ 464/180 |
| 4,884,666 A | * | 12/1989 | Stahl ......................... 464/180 X |
| 6,089,204 A | * | 7/2000 | Shaffer .................... 74/574.4 X |
| 2003/0133801 A1 | | 7/2003 | Orocio |

FOREIGN PATENT DOCUMENTS

| | | |
|---|---|---|
| CN | 1822162 A | 8/2006 |
| DE | 102006060583 A1 | 6/2008 |
| EP | 1184590 A2 | 3/2002 |
| JP | 2253134 A | 10/1990 |

OTHER PUBLICATIONS

Horace, et al. New Approaches to Structural Mechanics, Shells, and Biological Structures. Boston, MA: Kluwer Academic Publishers, 2002. [retrieved on Feb. 5, 2013]. Retrieved from the Internet: <URL: books.google.com/books?isbn=1402008627> p. 32.*

(Continued)

*Primary Examiner* — Gregory Binda
*Assistant Examiner* — Josh Skroupa

(57) ABSTRACT

An apparatus including a shaft mounted for rotation and a balancing sleeve is provided. The balancing sleeve functions to balance the shaft during rotation and includes first and second ends. The first end is secured to the shaft so that the balancing sleeve is substantially concentric with the shaft and rotates with the shaft. The second end incorporates balancing weight to balance the shaft at lower speeds of rotation of the shaft where there is substantially no flexing of the shaft. The lengthwise stiffness of the balancing sleeve is matched to the lengthwise stiffness of the shaft to maintain balance of the shaft at higher speeds of rotation of the shaft where there is flexing of the shaft.

15 Claims, 5 Drawing Sheets

(56) References Cited

OTHER PUBLICATIONS

Karwa. R. A Textbook of Machine Design. New Dehli, India. Laxmi Publications, 2005. [retrieved on Feb. 5, 2013]. Retrieved from the Internet: <URL: books.google.com/books?isbn=817008833X> p. 48-49.*

"Solid Mechanics: Balancing." Free Study: Free Tutorials on Engineering and Science. Jul. 17, 2004. [online]. [retrieved on May 2, 2013]. Retrieved from the Internet <URL:http://web.archive.org/web/20040717020559/http://www.freestudy.co.uk/dynamics/balancing.pdf>.*

Standler, B. "Technical Writing." Sep. 24, 1999, [online]. [retrieved on Jun. 2, 2013]. Retrieved from the Internet: <URL:http://www.rbs0.com/tw.htm>.*

* cited by examiner

FIG 1
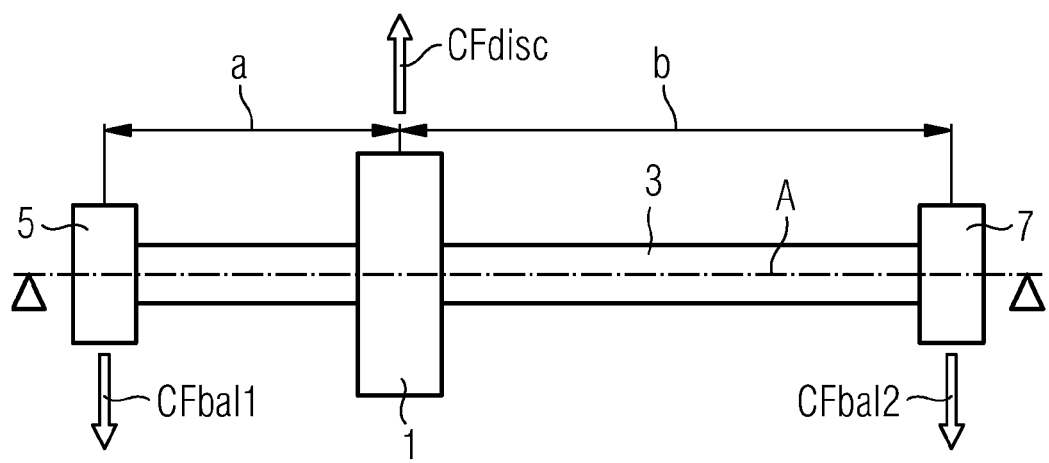
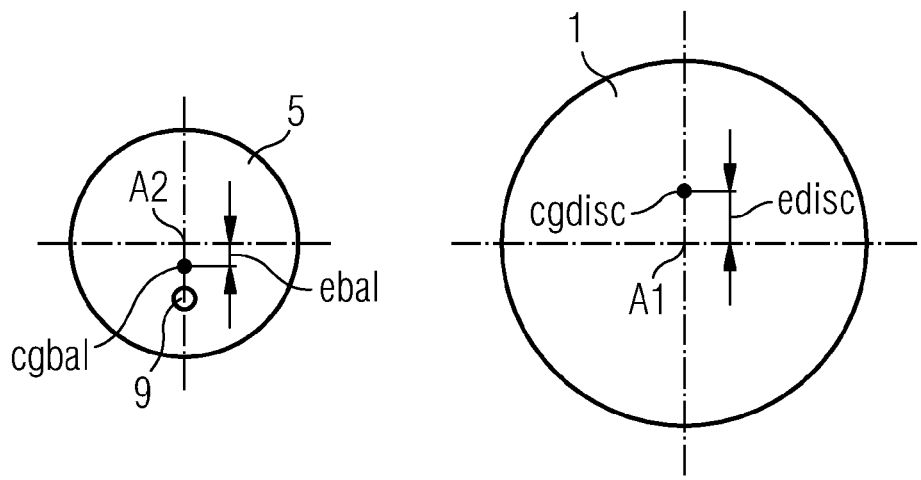

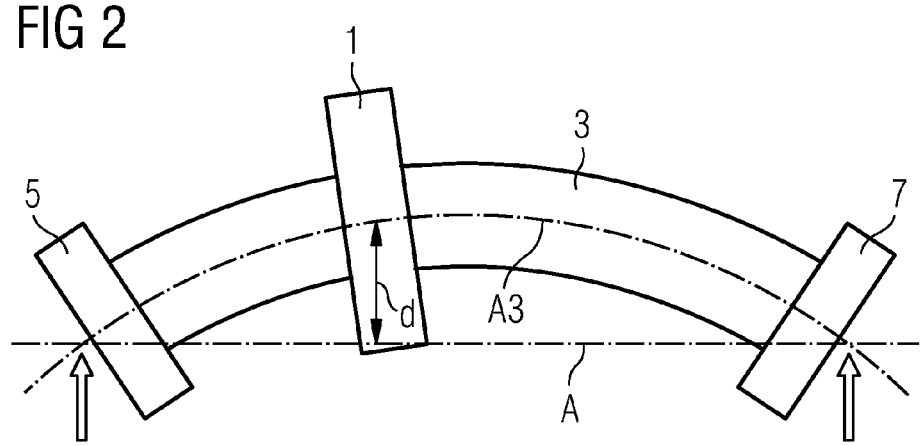
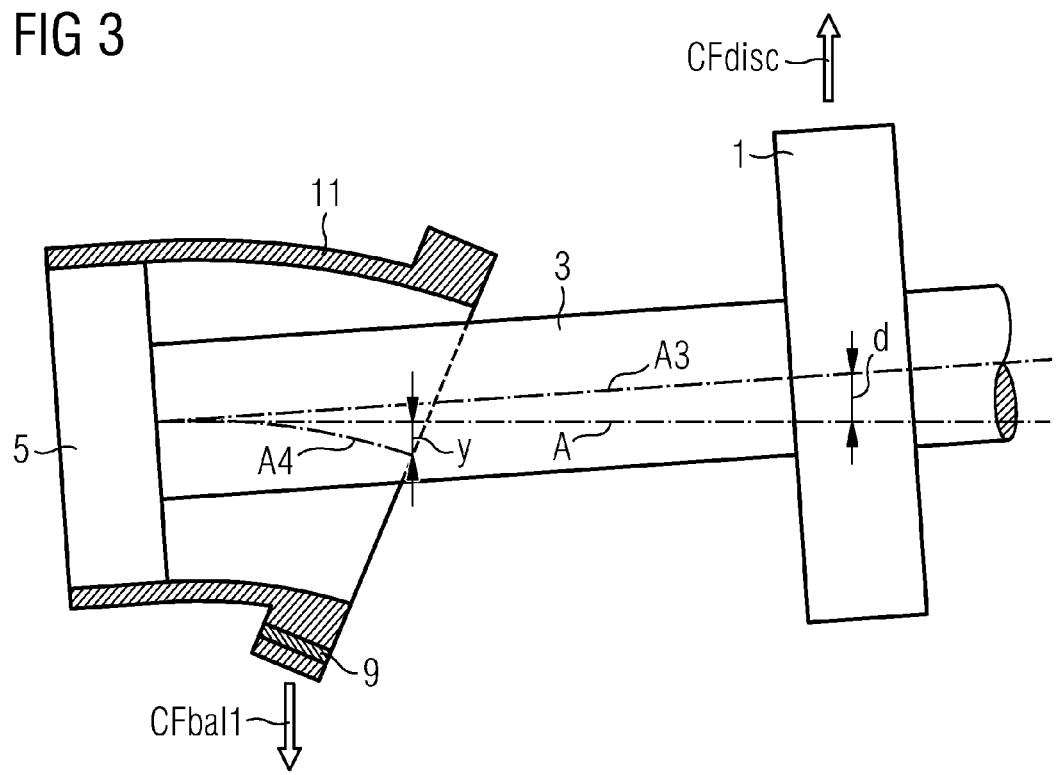

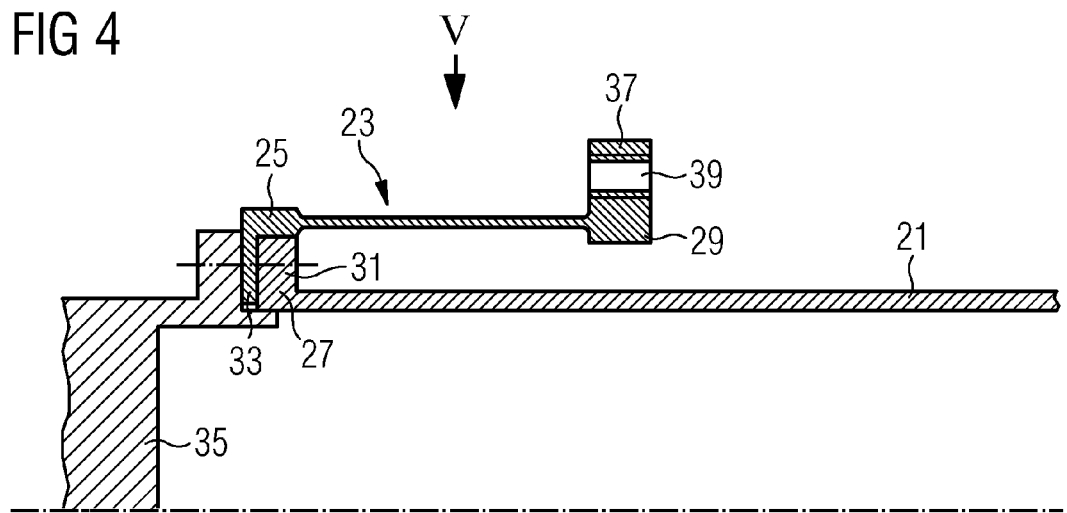
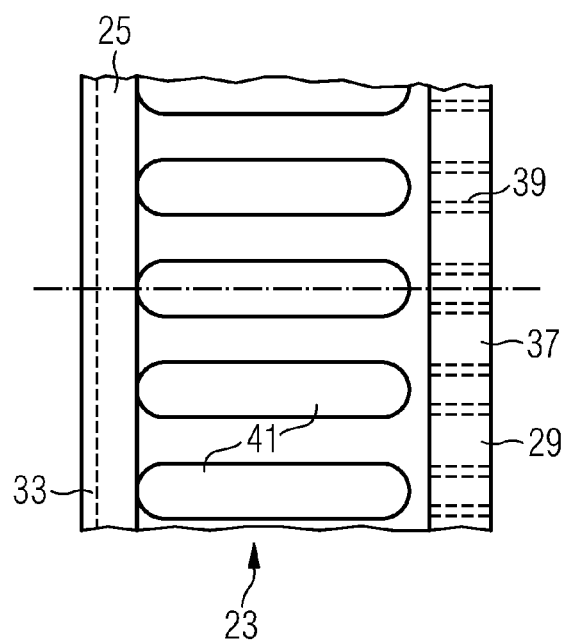

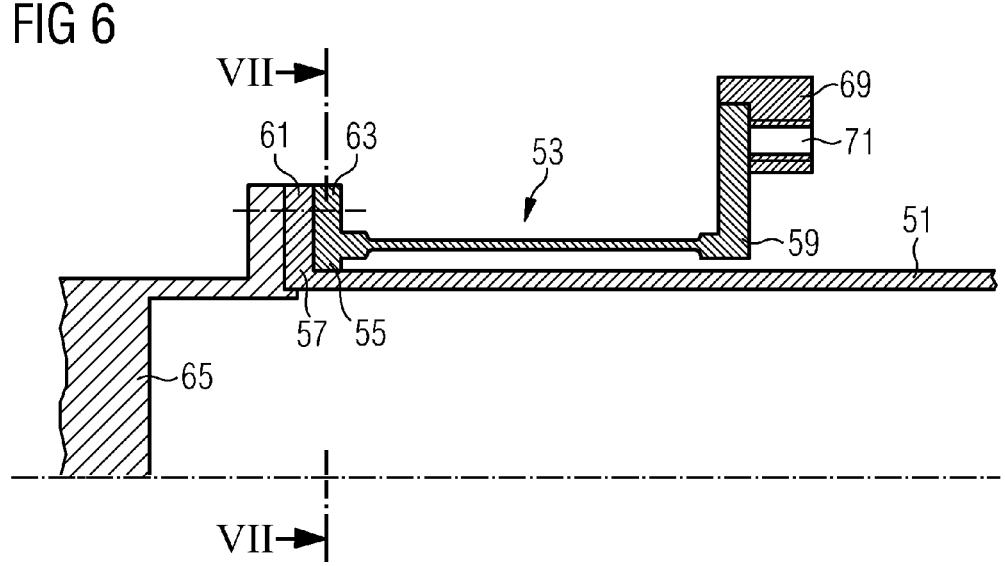
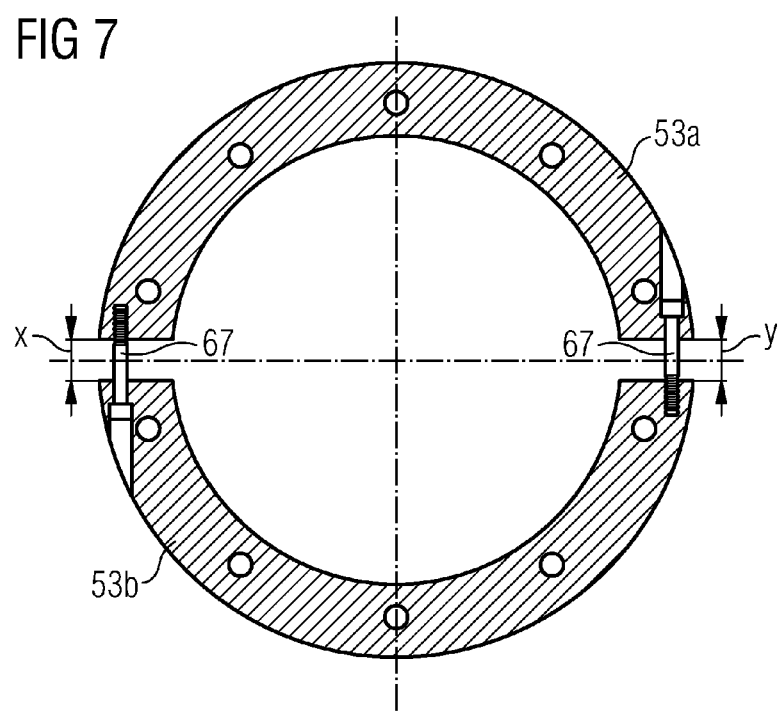

APPARATUS COMPRISING A SHAFT AND A BALANCING SLEEVE

CROSS REFERENCE TO RELATED APPLICATIONS

This application is the US National Stage of International Application No. PCT/EP2010/052336, filed Feb. 24, 2010 and claims the benefit thereof. The International Application claims the benefits of European application No. 09154259.7 EP filed Mar. 3, 2009. All of the applications are incorporated by reference herein in their entirety.

FIELD OF INVENTION

This invention relates to an apparatus comprising a shaft and a balancing sleeve.

The invention finds application in a mechanical drive apparatus comprising a coupling shaft for coupling a driver unit at a first end of the shaft to a driven unit at a second end of the shaft, in use of the apparatus the driver unit rotating the shaft to drive the driven unit.

BACKGROUND OF INVENTION

It can be difficult to balance the coupling shaft at both lower and higher speeds of rotation due to flexibility of the shaft. This will now be explained with reference to FIGS. 1 and 2.

In FIG. 1, a disc 1 is mounted on a shaft 3, and balancing flanges 5, 7 are mounted on the ends of the shaft. The shaft is mounted for rotation about an axis A. The distance between disc 1 and flanges 5, 7 is a and b respectively. The centre of gravity cgdisc of disc 1 is displaced vertically upwards from the axis A1 of disc 1 by a distance edisc (the eccentricity of disc 1). The centre of gravity cgbal of balancing flange 5 is displaced vertically downwards from the axis A2 of flange 5 by a distance ebal (the eccentricity of flange 5). The displacement of the centre of gravity of flange 5 is due to the addition to the flange of balancing weight 9.

For balance of the shaft 3, the centrifugal force CFbal1 acting on flange 5 (as a result of its eccentricity) times the distance a+b from flange 5 to flange 7 must equal the centrifugal force CFdisc acting on disc 1 (as a result of its eccentricity) times the distance b from disc 1 to flange 7, i.e.

$$CFbal1.(a+b)=CFdisc.b \quad \text{(Equation 1),}$$

or $$Mbal.ebal.w2.(a+b)=Mdisc.edisc.w2.b \quad \text{(Equation 2),}$$

where Mbal is the mass of flange 5, Mdisc is the mass of disc 1, and w2 is the angular velocity of rotation squared.

This gives:

$$Mbal.ebal = (b/(a+b)).Mdisc.edisc \quad \text{(Equation 3),}$$

i.e. for balance the mass of balancing flange 5 times the eccentricity of flange 5 must equal b/(a+b) times the mass of disc 1 times the eccentricity of disc 1.

Equation 3 maintains balance at lower speeds of rotation, but at higher speeds an increase in CFdisc (due to the increase in speed) causes flexing of the shaft 3 as shown in FIG. 2 giving rise to a displacement d of the disc 1 from the axis A of rotation (the axis of the shaft 3 is referenced A3 in FIG. 2). The eccentricity of disc 1 is therefore effectively increased by d creating an additional centrifugal force acting on the disc which equals Mdisc.d.w2, resulting in Equation 3 no longer maintaining balance (note, there is negligible displacement of balancing flanges 5, 7 at higher speeds so the only increase in the centrifugal forces acting on flanges 5, 7 at higher speeds is due to the speed increase). Thus, at higher speeds a balancing error occurs which is proportional to the displacement d of the disc 1. It is not possible to balance the shaft 3 fully at both lower and higher speeds of operation due to flexing of the shaft.

SUMMARY OF INVENTION

According to the present invention there is provided an apparatus comprising a shaft mounted for rotation and a balancing sleeve for balancing the shaft during rotation, the balancing sleeve having first and second ends, the first end being secured to the shaft so that the balancing sleeve is substantially concentric with the shaft and rotates with the shaft, the second end incorporating balancing weight to balance the shaft at lower speeds of rotation of the shaft where there is substantially no flexing of the shaft, wherein the lengthwise stiffness of the balancing sleeve is matched to the lengthwise stiffness of the shaft to maintain balance of the shaft at higher speeds of rotation of the shaft where there is flexing of the shaft.

BRIEF DESCRIPTION OF THE DRAWINGS

The invention will now be described, by way of example, with reference to the accompanying drawings, in which:

FIG. 1, already referred to, illustrates a coupling shaft on which a disc is mounted partway along the shaft and balancing flanges are mounted on the ends of the shaft;

FIG. 2, already referred to, illustrates the shaft of FIG. 1 flexing at higher speeds of rotation of the shaft;

FIG. 3 illustrates the concept of the present invention by developing on that shown in FIGS. 1 and 2;

FIG. 4 is a partial longitudinal section through a first mechanical drive apparatus in accordance with the present invention;

FIG. 5 is a view on the arrow V in FIG. 4;

FIG. 6 is a partial longitudinal section through a second mechanical drive apparatus in accordance with the present invention;

FIG. 7 is a cross-section on the line VII-VII in FIG. 6;

DETAILED DESCRIPTION OF INVENTION

Figure 8:
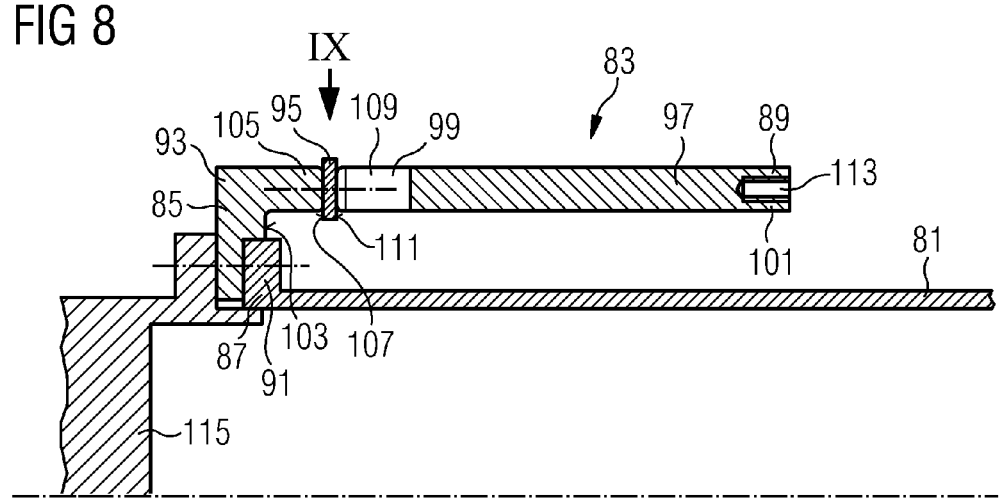
FIG. 8 is a partial longitudinal section through a third mechanical drive apparatus in accordance with the present invention.

Referring to FIG. 3, the present invention achieves balance of shaft 3 at both lower and higher speeds of rotation by the use of balancing sleeve 11, one end of which is fitted to balancing flange 5. Balancing weight 9 is no longer added to flange 5 but to the free end of sleeve 11, again vertically downwards from the axis A4 of sleeve 11. Again, the balancing weight is chosen to balance shaft 3 at lower speeds of rotation where there is negligible flexing of the shaft.

As before, at higher speeds, there will be a displacement d of disc 1, but this time, due to flexing of balancing sleeve 11, there will also be a displacement y of the balancing weight at the free end of sleeve 11 in the opposite direction to displacement d. This compensates for displacement d as will now be explained.

To maintain balance at higher speeds, $$CFbal1.(a+b)=CFdisc.b \quad \text{(Equation 4),}$$

or $$Mbal.(ebal+y).w2.(a+b)=Mdisc.(edisc+d).w2.b \quad \text{(Equation 5).}$$

Subtracting Equation 2 from Equation 5 gives:

$$Mbal.y.w2.(a+b)=Mdisc.d.w2.b \quad \text{(Equation 6),}$$

or $$Mbal.y=(b/(a+b)).Mdisc.d \quad \text{(Equation 7).}$$

Now:

$$CFbal1=Sbal.y \quad \text{(Equation 8),}$$

where Sbal is the stiffness of balancing sleeve 11, and $$CFdisc=Sshaft.d \quad \text{(Equation 9),}$$

where Sshaft is the stiffness of shaft 3.

Using Equations 8 and 9 to substitute for CFbal1 and CFdisc in Equation 1 gives:

$$Sbal.y.(a+b)=Sshaft.d.b \quad \text{(Equation 10),}$$

or $$(Sbal.y)/(Sshaft)=(b/(a+b)).d \quad \text{(Equation 11).}$$

Using Equation 11 to substitute for (b/(a+b)).d in Equation 7 gives:

$$Mbal.y=Mdisc.(Sbal.y)/(Sshaft) \quad \text{(Equation 12),}$$

or $$Sbal=Sshaft.(Mbal/Mdisc) \quad \text{(Equation 13).}$$

Thus, to maintain balance at higher speeds, the stiffness of the balancing sleeve 11 must be matched to that of the shaft 3 according to Equation 13.

As can be seen from Equation 13, in the simple case of FIGS. 1 to 3, the relationship between Sbal and Sshaft is independent of the speed of rotation, and therefore the matching of Sbal to Sshaft according to Equation 13 achieves balance of shaft 3 for all speeds of rotation. In more complex cases the matching of Sbal to Sshaft is more difficult. The axis A of rotation may not pass through the ends of shaft 3 due to the flexing of further mating shafts connected to these ends. This has the effect of increasing the displacement d of disc 1. Thus, when matching stiffness, the overall radial displacement of the centres of gravity must be considered. This can be complex. In view of the difficulty in matching stiffness it is advantageous to have available to trial balancing sleeves of different stiffness.

The choice of the stiffness of the balancing sleeve is made such that potential imbalance of the shaft at higher speeds due to flexing of the shaft is offset by potential opposite imbalance of the shaft at higher speeds due to flexing of the balancing sleeve (by potential opposite imbalance is meant the imbalance of the shaft that would occur at higher speeds due to flexing of the balancing sleeve if the shaft itself did not flex at all at higher speeds). In other words, imbalance of the shaft at higher speeds due to flexing of the shaft is countered by flexing of the balancing sleeve at these higher speeds.

Referring to FIGS. 4 and 5, the first mechanical drive apparatus comprises a coupling shaft in the form of a hollow tube 21, and a balancing sleeve 23 that surrounds tube 21 and is concentric with tube 21. A first end 25 of sleeve 23 is secured to a first end 27 of tube 21 so that sleeve 23 rotates with tube 21. From its first end 25 sleeve 23 extends partway along tube 21 to a second end 29 of sleeve 23.

First end 27 of tube 21 includes a circumferential flange 31 that extends radially outwardly. First end 25 of sleeve 23 includes a circumferential flange 33 that extends radially inwardly. Circumferential flange 33 of sleeve 23 is secured between circumferential flange 31 of tube 21 and a driver unit 35.

Second end 29 of sleeve 23 includes a circumferential flange 37 that extends radially outwardly, and second end 29 incorporates balancing weight by the provision of trim balance holes 39 in circumferential flange 37. Trim balance holes 39 are tapped to allow weights to be screwed in as required.

Sleeve 23 may include axially extending slots 41 to reduce its lengthwise stiffness.

In accordance with the above description with reference to FIGS. 1 to 3, especially FIG. 3, the balancing weight of second end 29 of balancing sleeve 23 is chosen to balance hollow tube 21 at lower speeds of rotation of tube 21 where there is negligible flexing of tube 21, and the stiffness of sleeve 23 is chosen to match the stiffness of tube 21 to maintain balance of tube 21 at higher speeds of rotation of tube 21 where there is flexing of tube 21.

Balancing sleeve 23 of FIGS. 4 and 5 is more suitable for use with a newly designed coupling shaft since if used with an existing coupling shaft it results in increased coupling length. Balancing sleeve 23, due to the improved balance it provides, enables the design of coupling shafts of longer length.

Referring to FIGS. 6 and 7, the second mechanical drive apparatus comprises a coupling shaft in the form of a hollow tube 51, and a balancing sleeve 53 that surrounds tube 51 and is concentric with tube 51. A first end 55 of sleeve 53 is secured to a first end 57 of tube 51 so that sleeve 53 rotates with tube 51. From its first end 55 sleeve 53 extends partway along tube 51 to a second end 59 of sleeve 53.

First end 57 of tube 51 includes a circumferential flange 61 that extends radially outwardly. First end 55 of sleeve 53 includes a circumferential flange 63. Circumferential flange 61 of tube 51 is secured between circumferential flange 63 of sleeve 53 and a driver unit 65. Sleeve 53 is divided lengthwise into a pair of half sleeves 53a, 53b of semicircular cross-section.

A clamp bolt 67 extends between pair of half sleeves 53a, 53b at each lengthwise division to adjust (i) the positions of half sleeves 53a, 53b so that they are concentric with tube 51, and (ii) the size X, Y in the circumferential direction of the divisions so that X=Y.

Sleeve 53 comprising pair of half sleeves 53a, 53b includes at its second end 59 a unitary locking ring 69 that locks together pair of half sleeves 53a, 53b. Second end 59 of sleeve 53 incorporates balancing weight by the provision of trim balance holes 71 in locking ring 69. Trim balance holes 71 are tapped to allow weights to be screwed in as required.

Half sleeves 53a, 53b comprising sleeve 53 advantageously include axially extending slots (not shown) as slots 41 in FIG. 5. The positioning of the slots relative to the lengthwise divisions between half sleeves 53a, 53b can then be chosen such that the lengthwise stiffness of sleeve 53 is the same in all radial directions.

In accordance with the above description with reference to FIGS. 1 to 3, especially FIG. 3, the balancing weight of second end 59 of balancing sleeve 53 is chosen to balance hollow tube 51 at lower speeds of rotation of tube 51 where there is negligible flexing of tube 51, and the stiffness of sleeve 53 is chosen to match the stiffness of tube 51 to maintain balance of tube 51 at higher speeds of rotation of tube 51 where there is flexing of tube 51.

Balancing sleeve 53 of FIGS. 6 and 7 can be used with newly designed or existing coupling shafts. When used with an existing coupling shaft, sleeves 53 of different stiffness can easily be tried (exchanged one for another) to see which best achieves balance.

Balancing sleeve 53 of FIGS. 6 and 7 is made up of two half sleeves 53a, 53b. It is to be appreciated that sleeve 53 may be made up of part sleeves of another fraction size, e.g. sleeve 53 may be made up of four quarter sleeves.

Figure 9:
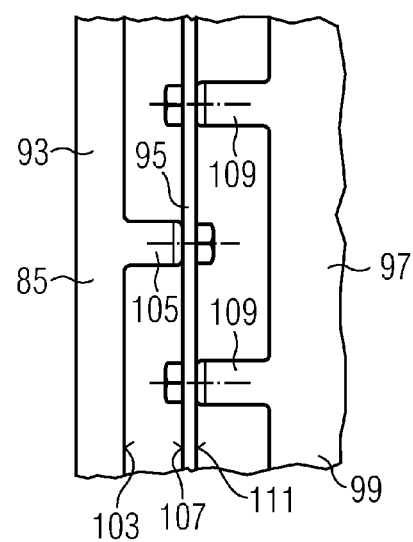
FIG. 9 is a view on the arrow IX in FIG. 8.

Referring to FIGS. 8 and 9, the third mechanical drive apparatus comprises a coupling shaft in the fowl of a hollow tube 81, and a balancing sleeve 83 that surrounds tube 81 and is concentric with tube 81. A first end 85 of sleeve 83 is secured to a first end 87 of tube 81 so that sleeve 83 rotates with tube 81. From its first end 85 sleeve 83 extends partway along tube 81 to a second end 89 of sleeve 83.

First end 87 of tube 81 includes a circumferential flange 91 that extends radially outwardly. Sleeve 83 comprises a rigid annular adaptor plate 93 adapted to be secured between circumferential flange 91 and a driver unit 115, a resilient annular disc 95 bolted to adaptor plate 93, and a rigid balancing tube 97 one end 99 of which is bolted to annular disc 95. Other end 101 of balancing tube 97 comprises second end 89 of sleeve 83. The lengthwise stiffness of sleeve 83 is determined by the resilience of annular disc 95.

One side 103 of annular adaptor plate 93 includes a first number of axially extending circumferentially spaced protrusions 105. One side 107 of resilient annular disc 95 is bolted to the ends of first protrusions 105. One end 99 of balancing tube 97 includes a second number of axially extending circumferentially spaced protrusions 109. Other side 111 of resilient annular disc 95 is bolted to the ends of second protrusions 109. The positions of attachment of first protrusions 105 to annular disc 95 are circumferentially intermediate the positions of attachment of second protrusions 109 to annular disc 95.

Second end 89 of sleeve 83 incorporates balancing weight by the provision of trim balance holes 113 in other end 101 of balancing tube 97. Trim balance holes 113 are tapped to allow weights to be screwed in as required.

Annular adaptor plate 93 may be unitary (cf. FIGS. 4 and 5) or divided in half into a pair of semicircular half adaptor plates (cf. FIGS. 6 and 7).

Balancing sleeves 83 of different stiffness can be provided by varying the resilience of resilient annular disc 95. Trialling balancing sleeves 83 of different stiffness can be done by installing in turn annular discs 95 of different resilience, the exchange of one annular disc 95 for another being done whilst annular adaptor plate 93 remains secured between circumferential flange 91 of tube 81 and driver unit 115. Another way to trial balancing sleeves 83 of different stiffness would be to provide an annular disc 95 made up of several relatively thin annular discs, and to vary the stiffness by changing the number of constituent relatively thin annular discs.

In accordance with the above description with reference to FIGS. 1 to 3, especially FIG. 3, the balancing weight of second end 89 of balancing sleeve 83 is chosen to balance hollow tube 81 at lower speeds of rotation of tube 81 where there is negligible flexing of tube 81, and the stiffness of sleeve 83 is chosen to match the stiffness of tube 81 to maintain balance of tube 81 at higher speeds of rotation of tube 81 where there is flexing of tube 81.

The flexing of balancing sleeve 83 of FIGS. 8 and 9 is provided by a different mechanism to balancing sleeve 23 of FIGS. 4 and 5 and balancing sleeve 53 of FIGS. 6 and 7. Balancing sleeves 23, 53 are essentially cantilever beams of tubular construction, and the flexing of sleeves 23, 53 is provided by bending of the beams. The flexing of balancing sleeve 83 is provided by the flexing of resilient annular disc 95, in particular the flexing of the arcuate sections of annular disc 95 between adjacent first protrusions 105 of annular adaptor plate 93 and between adjacent second protrusions 109 of one end 99 of balancing tube 97. The stiffness of sleeves 23, 53 does not increase with increased flexing. The stiffness of sleeve 83 progressively increases with increased flexing. The initial relatively low stiffness of sleeve 83 provides increased stability in very unstable coupling shafts.

In the first, second and third mechanical drive apparatus of FIGS. 4 to 9 the balancing sleeve extends from one end of the coupling shaft partway along the shaft. It is to be appreciated that the balancing sleeve could extend in the opposite direction, i.e. from the one end of the shaft away from the shaft and over the driver unit.

It is to be realised that the present invention is not only applicable to balancing a coupling shaft that couples a driver unit to a driven unit, but can be used to balance any rotating shaft, e.g. a rotating shaft of a turbine, a compressor, a motor or gearing.

The invention claimed is:

1. An apparatus, comprising:
a shaft mounted for rotation; and
a balancing sleeve for balancing the shaft during rotation, the balancing sleeve comprising:
 a first end secured to the shaft so that the balancing sleeve is substantially concentric with the shaft and rotates with the shaft, and
 a second end incorporating a balancing weight to balance the shaft at a first speed of rotation of the shaft in which there is substantially no flexing of the shaft,
wherein the lengthwise stiffness of the balancing sleeve is matched to the lengthwise stiffness of the shaft to maintain balance of the shaft at a second speed of rotation of the shaft in which there is flexing of the shaft, the second speed being higher than the first speed.

2. The apparatus according to claim 1, wherein:
the apparatus is a mechanical drive apparatus;
the shaft is a coupling shaft for coupling a driver unit at a first end of the shaft to a driven unit at a second end of the shaft, wherein in operation, the driver unit rotates the shaft to drive the driven unit;
the balancing sleeve surrounds the shaft;
the first end of the sleeve is secured to the first end or second end of the shaft; and
the sleeve extends partway along the shaft to the second end of the sleeve.

3. The apparatus according to claim 2, wherein:
the first end or second end of the shaft to which the first end of the sleeve is secured includes a circumferential flange that extends radially outwardly;
the first end of the sleeve includes a circumferential flange that extends radially inwardly; and
the circumferential flange of the sleeve is adapted to be secured between the circumferential flange of the shaft and the driver/driven unit.

4. The apparatus according to claim 3, wherein the second end of the sleeve includes a further circumferential flange that extends radially outwardly and the second end of the sleeve incorporates balancing weight by the incorporation of balancing weight in the further circumferential flange of the second end of the sleeve.

5. The apparatus according to claim 3, wherein the sleeve includes axially extending slots for reducing the lengthwise stiffness of the sleeve.

6. The apparatus according to claim 2, wherein the first end or second end of the shaft to which the first end of the sleeve is secured includes a circumferential flange that extends radially outwardly, the first end of the sleeve includes a circumferential flange, the circumferential flange of the shaft is adapted to be secured between the circumferential flange of the sleeve and the driver/driven unit, and the sleeve is divided lengthwise into a pair of half sleeves of semicircular cross-section.

7. The apparatus according to claim 6, wherein the sleeve comprising the pair of half sleeves includes at its second end a unitary locking ring that locks together the pair of half sleeves, and the second end of the sleeve incorporates balancing weight by the incorporation of balancing weight in the locking ring.

8. The apparatus according to claim 6, wherein the half sleeves of the sleeve include axially extending slots, and the positioning of the slots relative to the lengthwise divisions between the half sleeves is such that the lengthwise stiffness of the sleeve is the same in all radial directions.

9. The apparatus according to claim 2, wherein:
the first end or second end of the shaft to which the first end of the sleeve is secured includes a circumferential flange that extends radially outwardly,
the sleeve comprises a rigid annular adaptor plate adapted to be secured between the circumferential flange of the shaft and the driver/driven unit,
a resilient annular disc is provided that is secured to the adaptor plate,
a rigid balancing tube is provided, one end of which is secured to the annular disc, the other end of the balancing tube comprising the second end of the sleeve, and
the lengthwise stiffness of the sleeve being determined by the resilience of the annular disc.

10. The apparatus according to claim 9, wherein:
one side of the annular adaptor plate includes a first number of axially extending circumferentially spaced protrusions,
a first side of the resilient annular disc is secured to the ends of the first protrusions,
the one end of the balancing tube includes a second number of axially extending circumferentially spaced protrusions,
a second side of the resilient annular disc is secured to the ends of the second protrusions, and
the positions of attachment of the first protrusions to the annular disc are circumferentially intermediate the positions of attachment of the second protrusions to the annular disc.

11. The apparatus according to claim 9, wherein the second end of the sleeve incorporates balancing weight by the incorporation of balancing weight in the other end of the balancing tube.

12. The apparatus according to claim 9, wherein the annular adaptor plate is divided in half into a pair of semicircular half adaptor plates.

13. The apparatus according to claim 2, wherein the shaft comprises a hollow tube.

14. The apparatus according to claim 1, wherein a clamp bolt extends between the pair of half sleeves at each lengthwise division to adjust (i) the concentricity of the half sleeves with respect to the shaft, and (ii) the size in the circumferential direction of the divisions.

15. The apparatus according to claim 1, wherein:
a centre of gravity of the shaft is displaced from an axis of the shaft in a first radial direction, and by the balancing weight the centre of gravity of the second end of the sleeve is displaced from the axis of the sleeve in a second radial direction opposite to the first radial direction such as to balance the shaft at the first speed of rotation of the shaft where there is substantially no flexing of the shaft; and
the matching of the lengthwise stiffness of the sleeve to that of the shaft is such that potential imbalance of the shaft at the second speed of rotation of the shaft due to flexing of the shaft is offset by flexing of the sleeve.

* * * * *